Patented May 5, 1953

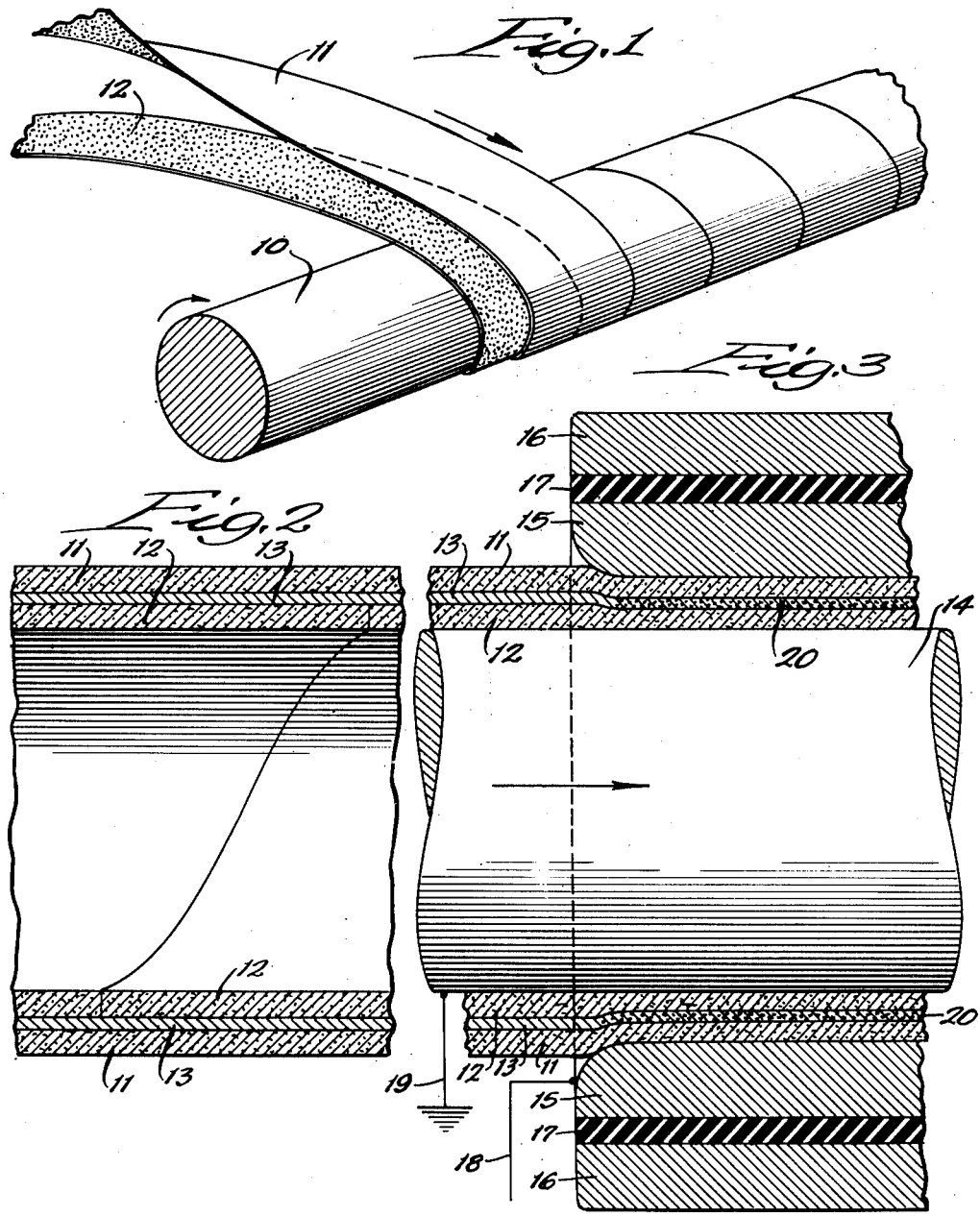

2,637,674

UNITED STATES PATENT OFFICE 2,637,674

PREPARATION OF IMPREGNATED LAMINATED TUBES

William F. Stahl, Kenilworth, Ill.

Application August 31, 1946, Serial No. 694,340

4 Claims. (Cl. 154—83)

This invention relates to the preparation of impregnated laminated tubes. The invention is particularly useful in the construction of laminated or spirally-wrapped tubes which are impregnated with a phenolic resin or the like.

In attempts to impregnate spirally-wrapped tubes with phenolic resins, unsatisfactory results have been obtained because the water-soluble adhesive employed forms a bar which prevents complete impregnation. Also, during the impregnation, there is considerable swelling and distortion which renders the product unsatisfactory.

An object of the present invention is to provide a process whereby the impregnation with a phenolic resin is rendered complete so that the layers of the tube are thoroughly integrated by the resin. A further object is to provide an impregnated tube treated in such a manner as to produce a product of uniform diameter and which is thoroughly integrated by the resin employed. Yet another object is to provide a process whereby a spirally-wrapped tube is readily formed and in which a product of uniform outside diameter is produced while at the same time causing the resin from one layer to join the resin from another layer so as to integrate the two. Other specific objects and advantages will appear as the specification proceeds.

The invention is illustrated in the accompanying drawing, in which—

Figure 1 is a perspective view of a mandrel upon which the tape is wound in forming the spiral tube; Fig. 2, a longitudinal sectional view of the tube; and Fig. 3, a longitudinal sectional view of the tube carried by a mandrel and being passed through a die, all of the parts being shown in section.

The spiral tube may be formed in any suitable manner. It is preferred to form the tube upon a mandrel 10. The tube is formed of two layers of paper or tape 11 and 12, and the two strips are united by a suitable adhesive. The two strips 11 and 12 may have liquid adhesive applied between them. At least one of the strips 11 and 12 has its inner face provided with adhesive and, in the illustration given, both of the sheets 11 and 12 are provided with adhesive on their inner sides. The adhesive may be the usual water-soluble animal base glue employed for uniting tape strips of this sort to form a spiral tube. Such a glue has a crystallization point of about 260° F.

After the spiral tube has been formed, it is removed from the mandrel 10, and the two strips of paper 12 and 11 are found to be united by a central layer of glue 13, as indicated best in Fig. 2. The tube is then impregnated with a phenolic or similar resin of the thermo-setting type by any suitable method. The usual and very satisfactory practice is to place the tubes within a vat containing the resin and vacuum and pressure are applied alternately to the vat.

After the impregnation step and at least a partial drying, the tube is placed upon a mandrel 14 and is advanced slowly under pressure through a die member 15. The die 15 is preferably slightly smaller than the tube so as to produce a compressive effect upon the tube, as illustrated best in Fig. 3. The die 15 may be supported by a casing 16, electrical insulation 17 being provided between the casing and the die.

A high frequency current is supplied through line 18 to the die 15 so as to create heat within the tube through its dielectric resistance. The frequencies may be varied considerably, depending upon the dielectric resistance of the product being treated. For example, frequencies of from 10 to 10,000 megacycles have been employed with different products. The mandrel 14 is preferably grounded as indicated at 19.

Any suitable thermo-setting resin may be employed. I prefer to employ a phenol-formaldehyde resin which will set to form a solid body at temperatures well above those required for crystallizing the adhesive 13.

In the operation of the process, the tube is formed by wrapping two layers of tape in the relation indicated in Fig. 1 over a mandrel. After the tube is completed, it is removed from the mandrel and appears in cross section, as indicated in Fig. 2, with the layer of adhesive extending between the paper layers. It will be understood that the tube may be formed by different methods to produce the inner and outer paper layers separated by an adhesive layer.

After the impregnation step, as already described, the tube is placed upon another mandrel 14 and is advanced through the die 15. The application of a high frequency current to the die results first in raising the temperature of the tube to 260° F. or to whatever the crystallizing point of the adhesive is. At this point, the adhesive crystallizes, separating and breaking up, while shortly thereafter the resin, under a higher temperature, flows freely through the crystallized adhesive and effects a juncture of the resin on the inner web of paper with the resin on the outer web of paper. The crystallized portion of the adhesive is indicated by the numeral 20 in Fig. 3. The continued application of high frequency current raises the temperature of the tube further so that a curing of the resin is accomplished, the resin setting to a solid body at the higher temperature. At this point, it is found that the solidified resin is continuous from the outside of the tube to the inside and thoroughly integrates the structure.

The heat applied to the die further facilitates the integrating of the structure as it is pressed through the die 15. The simultaneous application of heat and physical pressure to the tube not only causes the resin to flow freely, but squeezes the resin inwardly through the crystallized adhesive so that a union of the resin in the two webs is effected over a wide area. The resulting tube is of uniform size and outside diameter. It is ready for use without further treatment, such as grinding, etc.

While in the illustration given, the process is shown applied to a round tube, it will be understood that the process is applicable to square tubes or tubes of any configuration.

While in the foregoing description, I have set forth a specific example of the process and product in considerable detail for the purpose of illustration, it will be understood that such details may be varied widely by those skilled in the art without departing from the spirit of my invention.

I claim:

1. In a process for constructing a laminated impregnated tube, the steps of passing a tube formed of spirally-wrapped paper strips with adhesive therebetween, the strips being impregnated with a resin which is thermo-setting at a higher temperature than the crystallization temperature of said adhesive, through a pressure die while applying high frequency currents to the die, the frequency and magnitude of the currents being such as to raise the temperature of the tube first to the crystallizing temperature of the adhesive and then to the thermosetting temperature of the resin.

2. In a process for constructing a laminated impregnated tube, the steps of forcing a tube formed of spirally-wrapped tape layers with glue therebetween, the tape being impregnated with a resin which is thermo-setting at a higher temperature than the crystallization temperature of the glue, through an annular die smaller than the outside diameter of the tube while applying a high frequency current to the die to raise the temperature of the tube first to the crystallizing point of the glue and then to the setting point of the resin.

3. In a process for constructing a laminated impregnated tube, the steps of spirally-wrapping fibrous tape to form a tube with water-soluble adhesive between the tape layers, impregnating said tube with a thermo-setting phenolic resin which sets at a temperature above the crystallizing temperature of the adhesive, and passing the tube through an annular die of smaller diameter than the outside diameter of the tube while heating the tube to the crystallizing temperature of the adhesive and then to the setting point temperature of said resin.

4. In a process for constructing a laminated impregnated tube, the steps of spirally-wrapping fibrous tape to form a tube with water-soluble adhesive between the tape layers, impregnating the tape layers with a thermo-setting phenolic resin which sets at a temperature above the crystallizing temperature of the adhesive, and passing the tube through an annular die of smaller diameter than the outside diameter of the tube while heating the tube to the crystallizing temperature of the adhesive and then to the setting point temperature of said resin, said die being heated by the application of a high frequency current thereto.

WILLIAM F. STAHL.

References Cited in the file of this patent

UNITED STATES PATENTS

| Number | Name | Date |
|---|---|---|
| 2,013,747 | Dunlap | Sept. 10, 1935 |
| 2,059,373 | Lloyd | Nov. 3, 1936 |
| 2,213,253 | Novak | Sept. 3, 1940 |
| 2,354,556 | Stahl | July 25, 1944 |
| 2,354,714 | Strickland, Jr. | Aug. 1, 1944 |
| 2,393,100 | Gallay et al. | Jan. 15, 1946 |
| 2,407,833 | Jablonsky | Sept. 17, 1946 |
| 2,478,181 | Coker et al. | Aug. 9, 1949 |

FOREIGN PATENTS

| Number | Country | Date |
|---|---|---|
| 527,674 | Great Britain | Oct. 14, 1940 |